July 27, 1965    R. S. COPELAND    3,197,355

METHOD OF MAKING A PATTERN COATED BACKING AND PRODUCT

Filed April 20, 1961

INVENTOR.
RICHARD S. COPELAND

BY *(signature)*

ATTORNEYS

United States Patent Office 3,197,355
Patented July 27, 1965

3,197,355
METHOD OF MAKING A PATTERN COATED
BACKING AND PRODUCT
Richard S. Copeland, Grand Rapids, Mich., assignor to
Sackner Products, Inc., Grand Rapids, Mich., a corporation of Michigan
Filed Apr. 20, 1961, Ser. No. 104,451
6 Claims. (Cl. 161—73)

This invention relates to an embossed laminate, and more particularly to a resilient backing pad for a decorative embossed laminate and a method of making a pad and a laminate.

Decorative laminates having an indentation-embossment pattern impart excellent aesthetic appeal to various surfaces such as in automobile interiors. Until now, however, the practical application of such laminates has been quite limited due to disadvantages and shortcomings inherent in the present laminates. For example, it would be very desirable to use embossed plastic laminates on automobile seat bolsters. At present, however, these laminates are not really satisfactory for this and other uses for several reasons.

Firstly, embossed laminates formed by present methods do not possess sharply defined, deep, pattern lines. Further, any defects in the underlying pad are highlighted with present pads, i.e. they tend to show through the plastic cover sheet. These faults are largely due to present methods of bonding the embossable (usually plastic) sheet to the underlying fibrous layer which normally involves coating the surface of the fibrous layer with an uncured liquid bonding resin. The resin coat dries to form a thin surface skin between th efibrous backing and plastic sheet and is later softened for bonding. This skin, however, tends to cause depression of the fibrous layer adjacent the embossment pattern when impressed by the indenting dies. Also, this bonding resin on the surface does not penetrate the deeper portions of the fibrous layer to act as an effective bonding agent between the fibers themselves. Therefore, the resulting embossment not only does not possess sharp lines but also tends to disappear in time due to the lack of a permanent set in the adjacent unbonded fibers.

Secondly, even when resins are saturated clear through the fibrous layer in efforts to obtain an effective bond between the individual fibers, the saturating liquid bonding resin when cured forms hard, non-resilient portions adjacent the embossment pattern and thus renders the laminate unsuitable for seat covering and other uses since it is lumpy.

Thirdly, the customary liberal application of resin to the entire surface of backing to obtain an effective bond causes the laminated article to become unsightly when used e.g. on an automobile seat, since the thermoplastic bonding resin causes the laminate to "set" in the compressed position on a hot day. Further, the resin sprayed over the whole surface definitely lessens the softness of the laminate.

These several shortcomings are exaggerated still further by the present use of dense felt pads as the backing layer.

Accordingly, it is an object of this invention to overcome these and other related shortcomings in the presently known embossed laminates by making possible a novel embossed laminate which is not only aesthetically superior but also has a much greater potential area of use. It may be used as a seat bolster or in any of several other uses to which the prior art laminates were not adaptable. Moreover, it is superior even in the old applications with respect to laminates which were adaptable to such uses as auto door paneling. This big improvement is accomplished by preparing a novel embossed laminate by a unique method that is actually substantially less expensive than prior methods. The resulting product has sharply defined and deep pattern lines. It does not possess hardened non-resilient portions adjacent the indentation embossment pattern lines. It involves a remarkable and lasting bond between the plastic sheet and the fibrous backing and even between the individual fibers themselves. The laminate is much softer in nature. The novel method allows the production of a laminate useful even for a seat bolster that will not tend to "set" in the compressed position on hot days.

These and many other objects will be apparent upon studying the following specification in conjunction with the drawings in which.

Basically, the invention comprises a backing pad for an embossable laminate and a method of forming a backing pad for an embossed laminate comprising the formation of a resilient fibrous layer by randomly positioning a plurality of individual fibers, and then dispersing a particulate binding resin substantially throughout the thickness of the fibrous layer in the pattern areas corresponding to the embossment pattern to be applied. The inventive backing pad includes a lofty, resilient, and porous layer formed of a plurality of fibers at random angles which are preferably intertangled, and having a resin binder finely dispersed substantially throughout its thickness in the areas of the pattern. The pad is preferably partially compacted by needling and preferably includes a reinforcing sheet on one side thereof. The dispersed particulate resin is preferably a powder.

Figure 1:
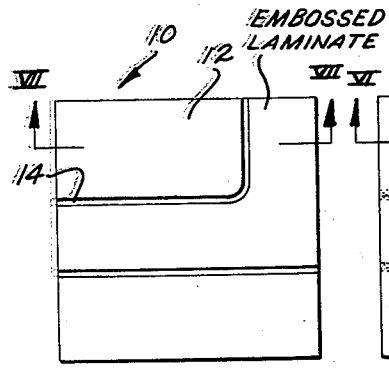
FIG. 1 is a plan view of the completed and embossed novel laminate.
Figure 6:
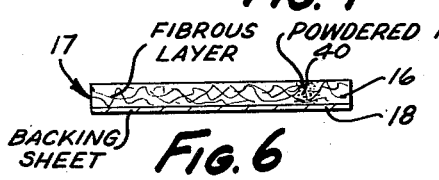
FIG. 6 is a sectional view taken on plane VI—VI of FIG. 2 showing the bonding resin dispersed throughout the thickness of the fibrous backing in a pattern.
Figure 7:
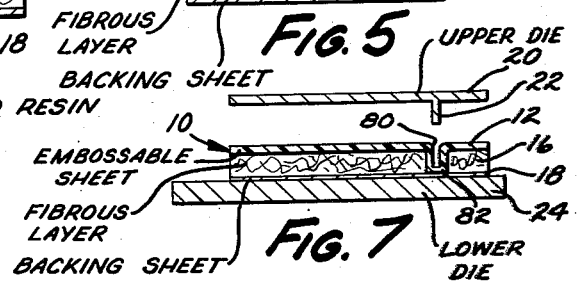
FIG. 7 is a sectional view of the decorative laminate taken on plane VII—VII of FIG. 1 and showing the embossing die.

Referring now to FIGS. 1 and 7, the complete decorative laminate 10 includes an embossable surface sheet 12 forming the surface layer and having a desired indentation pattern 14 impressed therein. This surface sheet is backed by a resilient, fibrous, and porous backing layer or pad 17 (FIG. 6) which preferably includes a reinforcing sheet 18.

Figure 2:
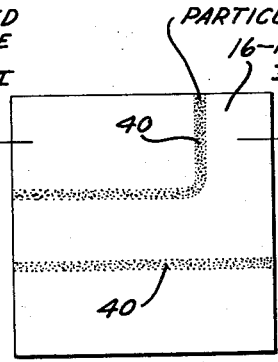
FIG. 2 is a plan view of the novel backing after application of the bonding resin by the novel method and without the embossed cover sheet.
Figure 4:
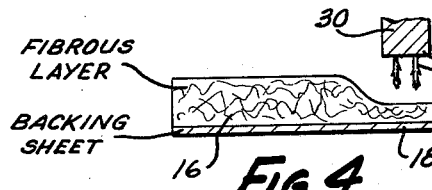
FIG. 4 is a sectional view of the backing depicting a needling process being performed thereon.

Referring to FIG. 2, the backing pad 16 comprises randomly oriented, individual fibers formed into a resilient, lofty, and porous layer. These fibers may be given their random positioning by any desirable method as, for example, by using air currents to loft and rearrange the fibers. Preferably, the formed layer is partially compacted by needling (FIG. 4) according to conventional needling processes. A reinforcing sheet 18 may be applied to the fibrous backing, if desired, and if so is done preferably before the needling step. During needling, head 30 of the needler reciprocates vertically very rapidly to drive a great number of small barbed needles 32 through the lofty layer to partially compact it, and also to intertangle the fibers with respect to each other and to any reinforcing sheet 18 used. The resulting partially-compacted layer maintains its porosity and also possesses improved resiliency as compared to the uncompacted layer.

After this needling step, the bonding resin is applied. According to the preferred form of the novel method, a particulate resin 40 (FIGS. 2 and 6) is dispersed substantially throughout the thickness of the fibrous layer but only in pattern areas corresponding to the embossment pattern to be formed in the laminate. This "resin binder" may be a suitable thermoplastic material, or may be an uncured thermosetting material. A preferred resin is a thermoplastic copolymer of vinyl acetate and vinyl chloride. This is especially preferred when the pad is formed of cellulose acetate fibers since the vinyl resins tend to "wet" the cellulose fibers to cause flow and obtain a very effective bond. Other thermoplastic bonding materials may be used such as acrylics (e.g. polymethylmethacrylate), or polystyrene, or any of various other polymers and copolymers which are well-known as good bonding materials. Various thermosetting binders may be used. A few examples are phenol formaldehyde materials, melamine formaldehyde materials, epoxy resins (e.g. from epichlorohydrin and bis-phenol A) or others. It will be apparent to those in the art that the choice of the thermoplastic resin, uncured thermosetting resin, or copolymer materials will vary with the use of the resulting laminate. The invention is not limited to a particular material since the above are only illustrative. It is important, however, in the choice of the binder that it is capable of dispersion into the fibrous layer; that it does not form a film on the fibrous layer at the temperature of binder application; that it be an effective binder for the particular fibrous material used and the particular embossable sheet used (whether the bond be physical, chemical or both); and preferably that it possess adhesive qualities to cause it to remain in its dispersed condition after application.

The bonding resin must be dispersed, and must be dispersed substantially through the entire thickness of the porous fibrous layer in the pattern areas. It is preferably applied in the form of a particulate material, with the most preferred form being that of a powder. It may be propelled in air, steam or the like, and may be charged electrostatically if desired. In a less preferred method, the resin may be dispersed into particulate form by being sprayed in a water or even a solvent-type vehicle. Again electrostatic techniques may be used.

The powdered resin is more amenable to complete dispersion, especially if the fibrous backing is unusually thick or compacted. It has been found that if the powder is dispersed substantially through the thickness of the layer, the last bit of desired dispersion actually occurs by simulated "flowing" of the powder when pressure is applied by the embossing die. Preferably, the resin is made to possess a very slight adhesion to the fibrous material to prevent sifting out of the dispersed resin from the porous layer before the embossment process. However, this characteristic must be controlled to prevent the formation of a surface film on the layer or a "glob" of resin anywhere in the layer. If desired, the resin may be applied to the pad before the needling process so that the needling disperses the resin throughout the fibrous layer.

Alternatively, it might be preferable in certain instances to apply the resin after needling to prevent it from being shaken out of its dispersed condition. This is true, for example, where the binder possesses little or no adhesiveness. If the resin is applied before needling, a more thorough penetration and dispersion usually results and consequently this is the preferred sequence when possible. Pre-needling application would be particularly desirable if the resin is originally in a form other than a finely-divided particulate form. For example, it is conceivable that thermoplastic fibers or the like may be needled and distributed into the pattern areas rather than the preferred particulate resin.

Figure 10:
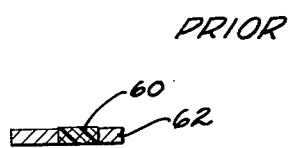
FIG. 10 is a sectional view depicting the prior art method of applying the bonding resin to the backing by liquid saturation.
Figure 11:
FIG. 11 is a sectional view depicting the prior art decorative laminate formed with the backing illustrated in FIG. 10.

The complete dispersement of the resin is very important since if a liquid resin 60 as in the prior art (FIG. 10) is saturated through the fibrous backing 62 to obtain an effective bond, a product (FIG. 11) results in which the areas 68 adjacent the indentation pattern 66 are hard, non-resilient lumpy portions even though the fibrous layer 62 is resilient.

Figure 8:
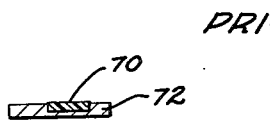
FIG. 8 is a sectional view depicting the prior art method of applying the bonding resin to the surface of the backing.
Figure 9:
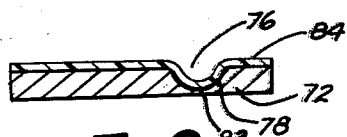
FIG. 9 is a cross sectional view depicting the prior art decorative laminate formed on the backing illustrated in FIG. 8.

It is also important that the resin applied be dispersed substantially through the entire thickness of the fibrous layer 16 as depicted in FIG. 6. If the bonding resin 70 (FIG. 8) is applied only to the surface of the fibrous layer 72 as in one prior art method, the resulting indentation pattern 76 does not possess sharply defined lines since the surface film 78 formed possesses sufficient tensile strength to cause long-lasting depression of a large share of the fibrous material 72 adjacent the indentation pattern. Also, there is no effective bonding between the fibers themselves making up the fibrous layer, and consequently the indentation pattern tends to disappear gradually with time due to a lack of an absolutely permanent setting of the fibers, and also due to a resilient matted portion 83 that becomes pressed under the prior art embossment. The surface resin of the prior art method cannot flow freely through the fibrous backing under pressure of the embossing die since it forms a dried film by the time the embossment takes place.

The "fibrous material" composing the resilient layer may vary widely depending upon the final characteristics desired, the cost factor, the binder to be used, among other factors. A preferred material to be used with a vinyl binder is a cellulose acetate fiber. Alternatively, a nylon or other synthetic fibers (e.g. viscose) may be used. Nylon is preferably used in combination with a binder other than vinyl. Various natural fibers may also be used such as wool, if desired, or even combinations of these materials. It is to be realized that the examples mentioned are merely illustrative and that a complete list of suitable materials would be very lengthy and superfluous. With the present method, the use of rather expensive thermoplastic fibers is not necessary to obtain an excellent embossment pattern, although these may be intermixed in the fibrous layer is desired.

Figure 3:
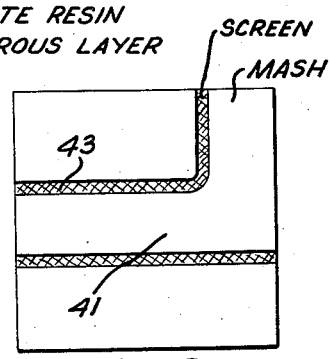
FIG. 3 is a plan view of a pattern printing screen useable in the novel method.
Figure 5:
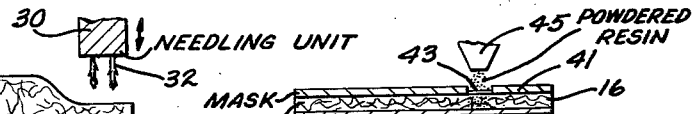
FIG. 5 is a sectional view showing the application of the bonding resin through a pattern screen in one form of the novel manner.

The resin 40 applied by the novel method may be limited to the pattern areas by a suitable screen 41 having openings only in the pattern areas 43 (FIGS. 3 and 5). The resin particles may be applied from a suitable applicator such as a gravity feed hopper or alternatively a pressurized spray gun 45 or the like. The fibrous layer may be shaken, if necessary, to assure dispersion of the powder into the porous layer and thereby forestall any tendency to form a surface layer.

In many instances, it has been found to be preferable to utilize a "reinforcing sheet" 18 in the pad 16. This sheet is preferably applied before needling so that the barbed needles anchor it firmly to the fibrous material. This sheet may be of a woven material such as one having a simple, straight-forward, back-and-forth weave, or such as a knitted fabric (i.e. formed by a series of knotting and looping steps); of a non-woven material such as a chemi-bonded fabric, or of a modified "synthetic paper" type material (formed by supplementing wood fibers on the Fourdrinier screen with fabric-type fibers); or in certain instances may be a film-type sheet such as polyethylene, vinyl or other similar materials. Thus, the particular "reinforcing sheet" may include any of these used alone or together, or their equivalents depending upon the desired characteristics of the laminate.

After the fibrous layer has been formed (preferably with the reinforcing sheet in place and the layer is needled), and after the binding resin has been applied, the "embossable sheet" 12 is placed in contact with the pad 16. This sheet may be any of several embossable materials, and is preferably dielectrically embossable. An example of a suitable material is any vinyl polymer (e.g. vinyl chloride-acetate copolymer). Other thermoplastic materials may be included to produce varied results, these including vinylidenes, polyethylene, polypropylene, nylon, and polymethyl methacrylate. The embossable sheet may be in the form of a film or a woven sheet (including straight weave, knitted, and the like) as desired as long as it possesses the capacity of being embossed, preferably dielectrically. Thermoplastic (embossable) sheets may be coated with cloth or may be uncoated. Further, a cloth sheet may be secured between two sheets of plastic as is well-known in the art. All of these illustrative of various types of embossable decorable cover sheets.

The embossment pattern is preferably produced by dielectric techniques with a very high frequency potential being applied across the laminate between projection 22 and lower platen 24 while impressing the laminate in a conventional manner. Sharply defined corners 80 (FIG. 7) are formed when the laminate comprising the novel fibrous backing 16 and plastic cover sheet 12 are subjected to the embossing die 20 including projection 22.

Because the resin is dispersed before this cover sheet and its backing are embossed, areas adjacent the indentation pattern are resilient in nature just like the remainder of the laminate. Further, since the bonding resin is dispersed only in the pattern areas, no remaining resin exists in the other areas of the pattern to cause matting of the pad on a hot day (as on a seat with a person sitting thereon), or to lessen the softness of the laminate. Still further, since the resin is dispersed through the entire thickness of the porous fibrous layer, a very effective fiber-to-fiber bond is created as well as very effective fiber-to-embossable sheet, and embossable sheet-to-reinforcing sheet bonds. The embossment pattern is consequently aesthetically luxuriant in appearance and permanent in nature. If a reinforcing sheet 18 is used, the embossable sheet 12 tends to bond very securely thereto since the fibers at area 82 largely become dissipated under the embossing pressure, especially if the fibers are a cellulose material and the bonding resin is a vinyl material. Not only are the results superior, but the product is ordinarily less expensive to produce since it necessitates only a fraction of the bonding resin used heretofore and in a resin form that is usually lower in price as compared to other forms such as fibers.

Various obvious modifications of the invention as disclosed in the illustrative material above will occur to those in the art. The invention is not to be limited to this illustrative material but only by the scope of the appended claims and the reasonable equivalents thereto.

I claim:

1. A backing pad for a decorative laminate to be embossed comprising, a fibrous resilient layer formed of a plurality of randomly oriented fibers; and a binder resin powder dispersed substantially throughout the thickness of said layer in a pattern area corresponding generally to the embossment pattern to be formed and said resin powder being suspended in the form of tiny particles by clinging contact with said fibers.

2. A backing pad for a decorative laminate to be embossed comprising, a fibrous, resilient layer formed of a plurality of randomly oriented, needled and somewhat intertangled fibers; a reinforcing sheet on one side of said layer; and a binder resin powder dispersed substantially throughout the thickness of said layer in at least a pattern area corresponding generally to the embossment pattern to be formed and clinging to said fibers.

3. A method of forming a backing pad for a decorative laminate to be embossed comprising the steps of, forming a resilient, porous, and fibrous layer from a plurality of randomly positioned fibers; and then dispersing particles of a resin binder powder substantially throughout the thickness of said layer with the particles of powder being suspended by said fibers in a pattern area corresponding generally to the embossment pattern to be formed.

4. A method of forming a backing pad for a decorative laminate to be embossed comprising the steps of, providing a fibrous material; randomly positioning the fibers of said material with respect to each other to from a lofty, porous and resilient layer; needling said layer to partially compact the same and intertangle said fibers; and dispersing a binder resin powder substantially throughout the thickness of said layer with the particles of powder being suspended by said fibers in at least a pattern area corresponding generally to the embossment pattern to be formed.

5. A method of forming a backing pad for a decorative laminate to be embossed comprising the steps of, providing a fibrous material; randomly positioning the fibers of said material with respect to each other to form a lofty, uncompacted, and resilient layer; applying a reinforcing sheet to one side of said layer; propelling particles of a particulate binder resin into and dispersing said particles substantially throughout the thickness of said layer in at least a pattern area corresponding generally to the embossment pattern to be formed with said particles being suspended by contact with said fibers, and needling said layer to intertangle a substantial number of said fibers and to partially compact said layer.

6. The method of making a decorative laminate comprising the steps of, providing a porous layer of fibrous material; then propelling particles of binder resin material into and dispersing them substantially throughout the thickness of said layer in a pattern area corresponding generally to the indentation embossment pattern to be formed; covering said layer with an embossable sheet; and embossing said sheet and layer with said indentation pattern, while simultaneously melting said particles and thereby bonding said sheet to said resilient layer and bonding said fibers to each other.

References Cited by the Examiner

UNITED STATES PATENTS

| 1,906,671 | 5/33 | Thunert | 154—122 |
| 2,287,159 | 6/42 | Zinser. | |
| 2,331,321 | 10/43 | Heaton. | |
| 2,537,126 | 1/51 | Francis. | |
| 2,784,132 | 3/57 | Maisel | 154—54 |
| 2,809,910 | 10/57 | Deddo | 156—106 |
| 3,046,173 | 7/62 | Copeland | 156—209 |

EARL M. BERGERT, *Primary Examiner.*

CARL F. KRAFFT, *Examiner.*